US007757594B2

(12) United States Patent
Supe-Dienes

(10) Patent No.: US 7,757,594 B2
(45) Date of Patent: Jul. 20, 2010

(54) LONGITUDINAL CUTTING MACHINE WITH COMBINED UPPER BLADE AND LOWER BLADE POSITIONING

(75) Inventor: Rudolf Supe-Dienes, Overath (DE)

(73) Assignee: Dienes Werke fur Maschinenteile (DE)

( * ) Notice: Subject to any disclaimer, the term of this patent is extended or adjusted under 35 U.S.C. 154(b) by 0 days.

(21) Appl. No.: 11/525,061

(22) Filed: Sep. 21, 2006

(65) Prior Publication Data

US 2007/0062355 A1 Mar. 22, 2007

(30) Foreign Application Priority Data

Sep. 21, 2005 (DE) .................. 20 2005 014 838 U

(51) Int. Cl.
*B23D 19/04* (2006.01)
*B23D 19/00* (2006.01)
*B26D 1/24* (2006.01)
*B26D 7/06* (2006.01)

(52) U.S. Cl. ............................ 83/498; 83/481; 83/504; 83/508.2; 83/425.4

(58) Field of Classification Search .................. 83/481, 83/482, 504, 508.2, 508.3, 698.61, 425.4
See application file for complete search history.

(56) References Cited

U.S. PATENT DOCUMENTS 3,905,264 A * 9/1975 Eddy .......................... 83/481
4,102,227 A * 7/1978 Simko ......................... 83/881
4,420,996 A * 12/1983 Greding et al. ................ 83/13
4,649,782 A * 3/1987 Cavagna .................... 83/425.4
4,934,234 A * 6/1990 Cavagna ...................... 83/498
5,546,840 A * 8/1996 Supe-Dienes ................ 83/478
5,690,012 A * 11/1997 Blandin et al. ................ 83/507
6,286,404 B1 * 9/2001 Miglietta ..................... 83/498
6,463,838 B2 * 10/2002 Hsu ............................ 83/481
6,837,135 B2 * 1/2005 Michalski .................. 83/477.2
7,086,173 B1 * 8/2006 Alatalo et al. ................. 33/640
7,134,372 B2 * 11/2006 Flaherty et al. ............ 83/425.4

* cited by examiner

*Primary Examiner*—Boyer D Ashley
*Assistant Examiner*—Bharat C Patel
(74) *Attorney, Agent, or Firm*—Robert W. Becker; Robert W. Becker & Assoc.

(57) ABSTRACT

A longitudinal cutting machine having an upper blade held and displaceable on a first longitudinal guide, and a lower blade that is associated with the upper blade, the lower blade being held on and displaceable along a second longitudinal guide. A displacement device is associated with one of the lower blade or upper blade, and is provided with an extendable driving rod that bridges a gap to that longitudinal guide that holds the other of the upper blade and lower blade. The driving rod acts on the other blade such that the displacement device displaces the upper blade and lower blade together. A guide mechanism is disposed on the driving rod and acts on that longitudinal guide that holds the other of the upper blade and lower blade.

17 Claims, 1 Drawing Sheet

LONGITUDINAL CUTTING MACHINE WITH COMBINED UPPER BLADE AND LOWER BLADE POSITIONING

BACKGROUND OF THE INVENTION

This specification for the instant application should be granted the priority date of Sep. 21, 2005, the filing date of the corresponding German patent application 20 2005 014 838.5.

The invention relates to a longitudinal cutting machine with an arrangement of upper blades held on a longitudinal guide and displaceable on the longitudinal guide and an arrangement of lower blades associated with the upper blades and held on a further longitudinal guide and displaceable along this longitudinal guide, at least one displacement device being provided for displacing the upper blade and the lower blade.

Such a longitudinal cutting machine with respective upper and lower blades displaceably arranged on associated longitudinal guides is disclosed in DE 100 23 210 B4. In this connection, the longitudinal guide for the upper blades is configured as a cross-member with blade holders for a respective upper blade guided thereon, while the lower blades configured as keyway cutters are displaceable on a lower blade shaft as a longitudinal guide. Insofar as during the operation of such longitudinal cutting machines, it is desirable to alter the cutting width of the webs of material cut by the associated blades, positioning devices are provided with such longitudinal cutting machines. In the longitudinal cutting machine known from DE 100 23 210 B4, a positioning device is firstly provided for the lower blades which respectively acts separately on an associated lower blade and displaces said lower blade into a predetermined position. A relatively complicated measuring and calculating system is provided to move the relevant lower blade precisely into the desired position. Accordingly, a second displacement device associated with the blade holders for the upper blades is activated, which undertakes the displacement of the upper blades into the position corresponding to the position of the lower blades.

When positioning the individual blades, the drawback associated with such a method is that the positioning is very time consuming, not only due to the individual adjustment of the upper blades and lower blades but also that a correspondingly synchronized control of the two displacement devices is required for the lower blades and the upper blades. During the respective adjustment of the upper blades and the lower blades, this may result in inaccuracies so that the upper blades and lower blades do not cooperate with one another with the desired cutting force.

The object of the invention, therefore, is to design a longitudinal cutting machine with the aforementioned features, such that an alteration of the cutting width may be carried out rapidly and with high positioning accuracy by means of corresponding adjustment of the upper blades and lower blades.

SUMMARY OF THE INVENTION

The fundamental idea of the invention provides that the displacement device respectively associated with the upper blade or the lower blade acts on the other respective blade by means of an extendable driving rod which bridges the gap to the longitudinal guide carrying the respective other blade, such that the displacement device displaces the upper blade and lower blade together, and that a guide device acting on the longitudinal guide carrying the respective other blade is arranged on the driving rod.

The advantage associated with the invention is that, by means of a central displacement device, the upper blade and lower blade may be displaced simultaneously with one another, so that the setup time is considerably reduced with such a longitudinal cutting machine.

Insofar as, to this end, a large distance has to be overcome between blades cooperating with one another, according to an embodiment an additional centering of the driving rod is provided on the respective longitudinal guide opposing the displacement device, to avoid inaccuracies due to deflection movements of the driving rod. A rigid system is produced thereby during the displacement movement which is satisfactory in its accuracy of displacement. It may also be satisfactory, according to an embodiment of the invention, if a guide device is arranged which acts frictionally on the longitudinal guide, the guide device, in this embodiment, also being able to act frictionally in a correspondingly provided receiver of the longitudinal guide.

According to an embodiment of the invention, the receiver configured on the longitudinal guide may be configured as a groove of V-shaped configuration and the driving rod may comprise at least one projection engaging positively in the groove in the displacement position and which may be displaced in the groove, care having to be taken within the scope of the embodiment of the invention that the projection resting positively in the groove is correspondingly displaced with low friction.

To this end, according to an embodiment of the invention, the projection may be configured as a wheel which may roll in the groove. In this connection, according to an embodiment of the invention it may be expedient for the wheel itself to be rotatable via an associated drive.

To improve the stability, according to an embodiment of the invention two projections and/or wheels, which are spaced apart from one another and engage in the groove, may be provided on the driving rod.

Alternatively, with regard to the design of the centering device, the receiver configured on the longitudinal guide may comprise a toothed rack fitted into the longitudinal guide and the driving rod may carry at least one toothed wheel engaging positively in the toothed rack in the displacement position, whereby, in turn, the toothed wheel may be rotated via an associated drive.

In order to create sufficient flexibility of the system with regard to the positive centering, when inserting the driving rod, the at least one projection and/or the at least one toothed wheel may be held on the driving rod by the intervention of a spring.

Advantageously, the displacement system may be designed such that by the application of the guide rod, the guiding of the respective blade carrier is unloaded simultaneously on the longitudinal guide of the longitudinal cutting machine, opposing the displacement device, whereby the receiver configured on the one longitudinal guide and the guide device carried by the driving rod are arranged relative to one another such that when the guide device positively engages completely in the receiver, the blade holder engaged by the driving rod is lifted and thus the guide arrangement of the blade holder on, the longitudinal guide carrying said blade holder is unloaded.

According to an embodiment of the invention, the driving rod may be configured as a driving fork acting on the blade holder.

Insofar as the blade holder has to be secured immovably on the longitudinal guide, during operation, but has to be released from the longitudinal guide during its displacement, according to an embodiment of the invention the blade holder may be secured to the longitudinal guide by means of a releasable clamping device and an actuating device may be arranged on the displacement device for releasing and clamping the clamping device. To this end, in a constructive embodiment, the clamping device may comprise a locking screw arranged on the blade holder, and an automatic screwing device may be arranged on the displacement device.

Alternatively, however, other clamping principles may also be realized, for example spring clamping, which may be released by unloading the spring by inserting an appropriate finger.

Insofar as the longitudinal guides configured on longitudinal cutting machines as cross-members are conventionally configured with blade holders, for an upper blade or a lower blade, guided thereon, according to an embodiment of the invention the blade holders are guided on the cross-member by means of a dovetail guide, the guide surfaces and sliding surfaces of the dovetail guide configured on the cross-member and the blade holders being lifted from one another by the driving rod in the displacement position. Such a design is advantageous when, according to an embodiment of the invention, the upper blade is vertically arranged over the lower blade, so that the displacement device associated with the lower blade lifts and unloads the upper blade in terms of weight by means of the driving rod which may be extended therefrom, such that the guide surfaces of the dovetail guide are released from one another.

This unloading principle is, however, also able to be used in a similar manner for a horizontal association of the upper blade and lower blade, as in this case the axes of the driving rod and receiver and/or guide device are aligned with one another such that, even with a horizontal association, the blade carrier is lifted from the cross-member to a certain extent.

BRIEF DESCRIPTION OF THE DRAWING

An embodiment of the invention is reproduced in the drawing which is described below.

FIG. 2 shows the driving rod in the opening and the projection in the groove.

DESCRIPTION OF SPECIFIC EMBODIMENTS

Figure 1:
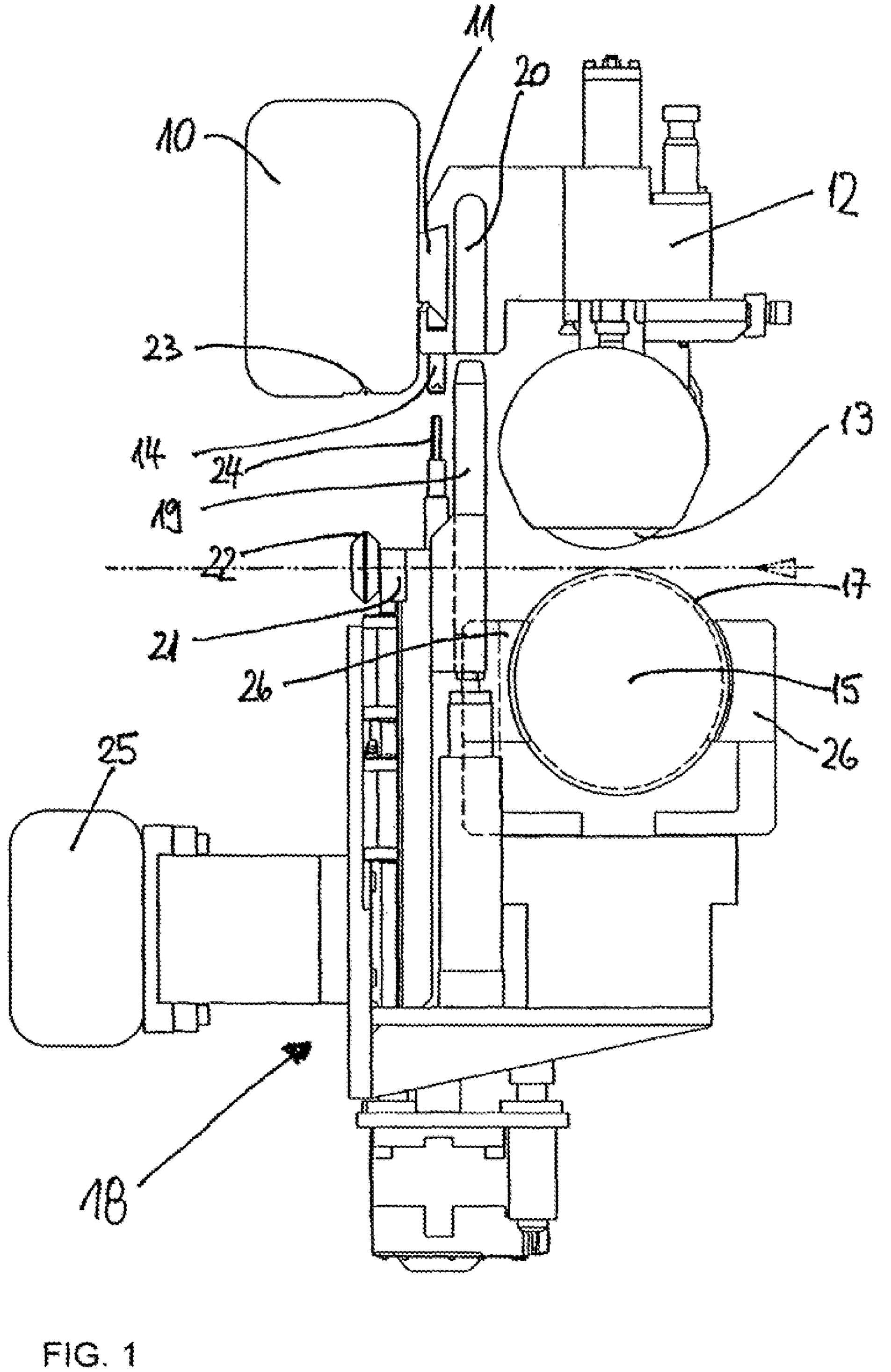
FIG. 1 show a diagrammatic view of a longitudinal cutting machine with longitudinal guides for holding an upper blade and a lower blade including an associated displacement device.

The FIG. 1 firstly shows an upper blade cross-member 10 as a longitudinal guide for holding an upper blade 13, a dovetail guide 11 being configured on the cross-member 10 for displaceably securing a blade holder 12 for the upper blade 13. The blade holder 12 may be secured to the dovetail guide 11 by means of a locking or clamping screw 14.

In the embodiment shown, the lower blade 17 is configured as a keyway cutter and displaceably arranged on a blade shaft 15 as a longitudinal guide for holding the lower blade 17.

A component of the longitudinal cutting machine is a displacement device 18 associated with the lower blade 17, and which is held and may be moved on a retaining cross-member 25. The displacement device 18 comprises movable clamping jaws 26 acting laterally on the lower blade 17 which are moved in a manner known from the prior art to bear against the lower blade 17 for the displacement of the lower blade 17 on the blade shaft 15. The displacement device 18 further comprises a driving rod 19 which may be moved in the direction of the upper blade 13. A receiver channel 20 is configured in the blade holder 12 for the upper blade 13, into which the driving rod 19 of the displacement device 18 is able to move before a displacement of the upper blade 13 and the lower blade 17 may occur. The blade holder 12 for the upper blade 13 is coupled to the displacement device 18 via this driving rod 19. An automatic screwing device 24 is also arranged on the displacement device 18 and which, with corresponding actuation, acts on the locking screw 14 and releases said locking screw before the displacement of the upper blade 13 and the lower blade 17.

To stabilize the driving rod 19 further in its extended displacement position, a projection 22 is arranged on the driving rod 19 over a shoulder 21 projecting laterally therefrom, and to which a groove 23 is associated as a receiver for the projection 22, on the lower face of the cross-member 10 holding the upper blade 13. Insofar as the groove 23 is of V-shaped configuration, the projection 22 has a correspondingly V-shaped form, designed to the dimensions of the groove 23, so that when introducing the projection 22 into the groove 23, the projection 22 is centered in the groove 23 so that, as a whole, the driving rod 19 is also centered and stabilized as per FIG. 2.

Insofar as the upper blade 13 and the lower blade 17 are displaced perpendicular to the drawing plane, care has to be taken that the projection 22 may be easily displaced in the groove 23, to which end the projection 22 may also be configured as a wheel rolling in the groove 23. For further stabilization it may be provided that in the plane of displacement perpendicular to the drawing plane, two projections 22 are arranged at a distance from one another, so that in this manner tilting of the displacement arrangement is also avoided in the displacement device.

If, before the displacement of the upper blade 13 and the lower blade 17, the driving rod 19 is introduced into the receiver channel 20 of the blade holder 12 and the projection 22 is therefore located in the groove 23, a rigid system is thus formed, by means of which a common displacement of the upper blade 13 and the lower blade 17 relative to one another is provided without dimensional tolerances as per FIG. 2.

The features of the subject of these documents disclosed in the above description, the claims, as well as the drawings, may be essential individually as well as in any combination for the realization of the invention in its different embodiments.

The specification incorporates by reference the disclosure of German priority document 20 2005 014 838.5 filed 21 Sep. 2005.

The present invention is, of course, in no way restricted to the specific disclosure of the specification and drawing, but also encompasses any modifications within the scope of the appended claims.

I claim:

1. A longitudinal cutting machine, comprising:

a first longitudinal guide, an upper blade that is held and is displaceable on said first longitudinal guide;

a second longitudinal guide;

a lower blade that is associated with said upper blade, wherein said lower blade is held on and is displaceable along said second longitudinal guide;

a displacement device associated with said lower blade, wherein said displacement device is provided with an extendable driving rod that bridges a gap to that said first longitudinal guide of said upper blade, and wherein said driving rod, when extended, acts on said upper blade such that said displacement device is adapted to displace said upper blade and said lower blade together;

wherein said driving rod has a guide mechanism projecting laterally therefrom, wherein said guide mechanism in the extended position of the driving rod is adapted to act on said first longitudinal guide of said upper blade such that the driving rod held on the displacement device of said lower blade is centered and stabilized by action of the driving rod on said upper blade and simultaneously by action of said guide mechanism on said first longitudinal guide of said upper blade, thereby forming a rigid system for displacement of said lower blade and said upper blade, respectively.

2. A longitudinal cutting machine according to claim 1, wherein a receiving means is formed on said first longitudinal guide, and wherein said guide mechanism is adapted to positively center in said receiving means.

3. A longitudinal cutting machine according to claim 1, wherein said guide mechanism is a guide mechanism that is adapted to act frictionally on said first longitudinal guide.

4. A longitudinal cutting machine according to claim 2, wherein said receiving means formed on said first longitudinal guide is a V-shaped groove, and wherein said guide mechanism is provided with at least one projection that in a displaced position engages positively in said groove and is displaceable therein.

5. A longitudinal cutting machine according to claim 4, wherein said projection is embodied as a wheel that is adapted to roll in said groove.

6. A longitudinal cutting machine according to claim 5, wherein a drive means is provided for rotating said wheel.

7. A longitudinal cutting machine according to claim 4, wherein two spaced-apart projections are provided that engage in said groove.

8. A longitudinal cutting machine according to claim 2, wherein said receiving means comprises a toothed rack disposed in said first longitudinal guide, and wherein said driving rod is provided with at least one toothed wheel that in a displaced position is adapted to positively engage said toothed rack.

9. A longitudinal cutting machine according to claim 8, wherein a drive means is provided for rotating said toothed wheel.

10. A longitudinal cutting machine according to claim 4, wherein said at least one projection is held on said driving rod via the interposition of a spring.

11. A longitudinal cutting machine according to claim 8, wherein said at least one toothed wheel is held on said driving rod via the interposition of a spring.

12. A longitudinal cutting machine according to claim 2, wherein a guide or a blade holder is disposed on said first longitudinal guide, and wherein said receiving means and said guide mechanism are disposed relative to one another such that with a complete positive engagement of said guide mechanism in said receiving means, said blade holder is adapted to be raised by said driving rod to thereby relieve said guide of said blade holder.

13. A longitudinal cutting machine according to claim 1, wherein said driving rod is embodied as a driving fork.

14. A longitudinal cutting machine according to claim 1, wherein a blade holder is adapted to be secured to said first longitudinal guide via a releasable clamping device, and wherein an actuating device for releasing and clamping said clamping device is disposed on said displacement device.

15. A longitudinal cutting machine according to claim 14, wherein said clamping device comprises a locking screw disposed on said blade holder, and wherein said actuating device is an automatic screwing device disposed on said displacement device.

16. A longitudinal cutting machine according to claim 1, wherein said first longitudinal guide or said second longitudinal guide is embodied as a cross-member having guided thereon blade holders for said upper blade or said lower blade.

17. A longitudinal cutting machine according to claim 16, wherein a dovetail guide is provided for guiding said blade holder on said first longitudinal guide, and wherein in a displaced position guide and glide surfaces of said dovetail guide formed on said first longitudinal guide and on said blade holder are adapted to be raised from one another by means of said driving rod.

* * * * *